(12) United States Patent
Flament et al.

(10) Patent No.: US 6,516,849 B2
(45) Date of Patent: Feb. 11, 2003

(54) SAFETY SUPPORT WITH A NOISE ATTENUATOR FOR A VEHICLE WHEEL

(75) Inventors: Julien Flament, Clermont-Ferrand (FR); Denis Jubert, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/109,450

(22) Filed: Mar. 28, 2002

(65) Prior Publication Data

US 2002/0104600 A1 Aug. 8, 2002

Related U.S. Application Data

(63) Continuation of application No. PCT/EP00/09551, filed on Sep. 29, 2000.

(30) Foreign Application Priority Data

Sep. 29, 1999 (FR) .............................. 99 12269

(51) Int. Cl.[7] .............................................. B60C 23/18
(52) U.S. Cl. ..................... 152/400; 152/381.5; 152/520
(58) Field of Search ........................... 152/381.5, 381.6, 152/399, 400, 401, 516, 520, 339.1, 340.1, 341.1, 342.1

(56) References Cited

U.S. PATENT DOCUMENTS

| 4,143,697 A | * | 3/1979 | Igea et al. ............... 152/340.1 |
| 4,248,286 A | | 2/1981 | Curtiss, Jr. et al. .......... 152/158 |
| 4,467,852 A | * | 8/1984 | Ippen et al. ................. 152/158 |
| 4,896,921 A | * | 1/1990 | Sato et al. ............. 152/381.5 X |
| 5,000,241 A | * | 3/1991 | Patecell ............... 152/381.5 X |
| 5,176,764 A | * | 1/1993 | Abbott et al. ......... 152/340.1 X |
| 5,891,278 A | * | 4/1999 | Rivin ..................... 152/400 X |
| 5,891,279 A | | 4/1999 | Lacour ........................ 152/520 |
| 6,109,319 A | * | 8/2000 | Gardetto ..................... 152/520 |

FOREIGN PATENT DOCUMENTS

| DE | 19801570 | 7/1999 |
| EP | 0663306 | 7/1995 |
| GB | 1138731 | 1/1969 |
| WO | 9835843 | 8/1998 |

OTHER PUBLICATIONS

English language abstract from Patent Abstracts of Japan for JP 07017222, published Jan. 20, 1995. Mitsuisa, "Core Assembly body for a Pneuatic Tire."

* cited by examiner

Primary Examiner—Russell D. Stormer
(74) Attorney, Agent, or Firm—Baker Botts L.L.P.

(57) ABSTRACT

A vehicle wheel, comprising a rim, a disc, a tire defining with the rim a circumferential cavity C, and at least one resonator suitable for attenuating a natural resonant frequency of said cavity, said wheel also comprising a safety support, for supporting the tread of this tire from the inside in the event of loss of inflation pressure, said support providing at least one of the walls of said resonator. The invention also provides for the safety support comprising resonators.

18 Claims, 10 Drawing Sheets

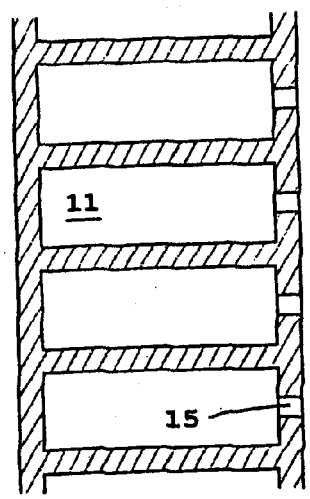
Figure 8-a
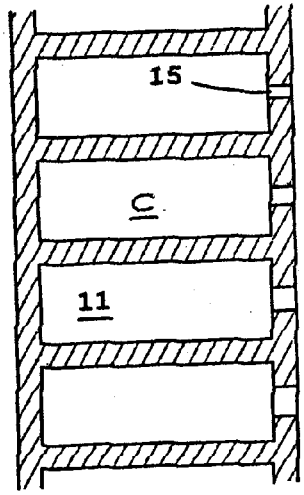
Figure 8-b
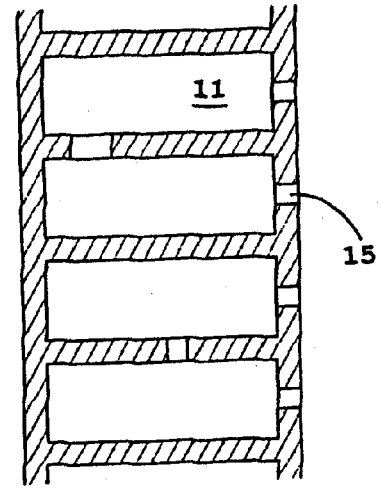
Figure 8-c
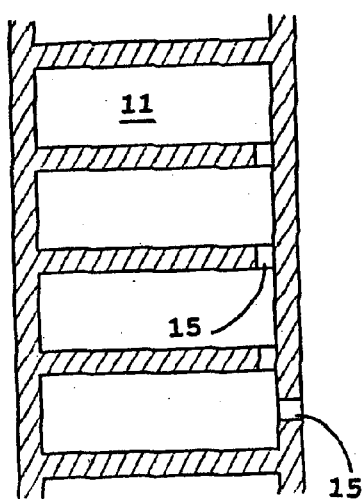
Figure 8-d
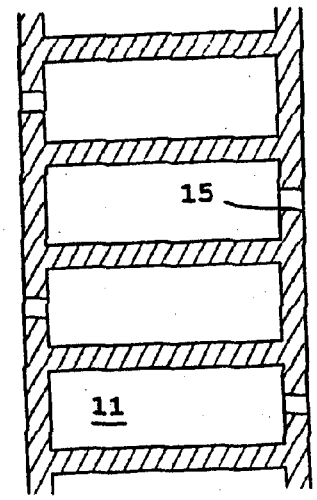
Figure 8-e
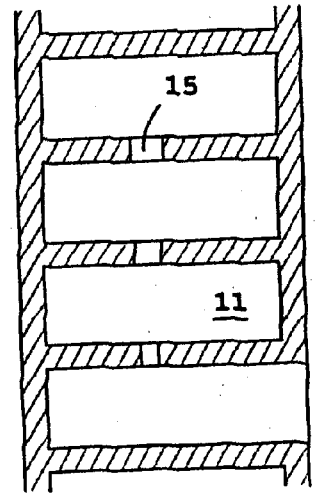
Figure 8-f

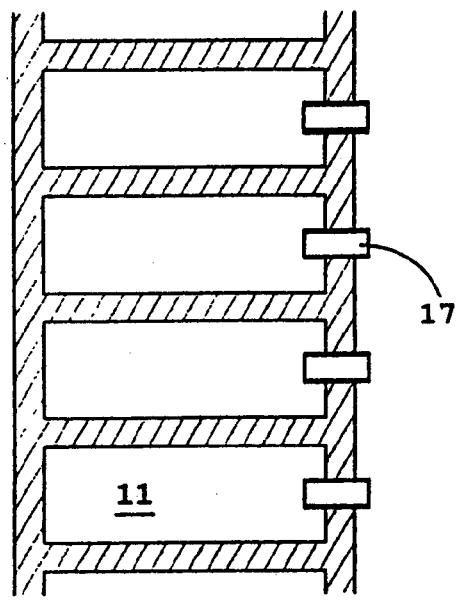
Figure 9-a
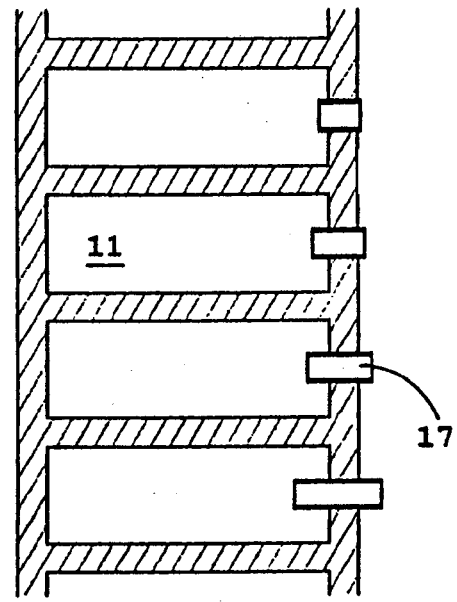
Figure 9-b
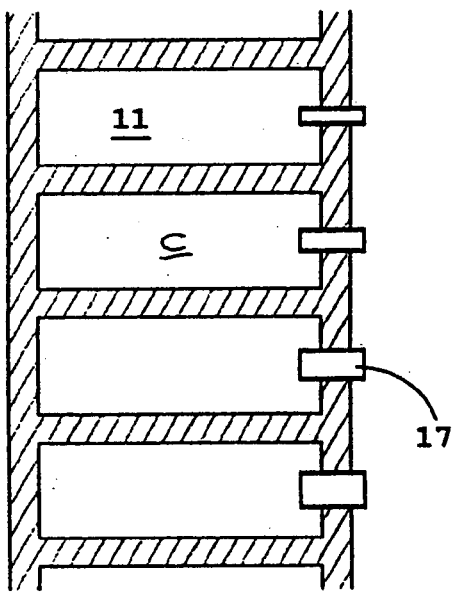
Figure 9-c
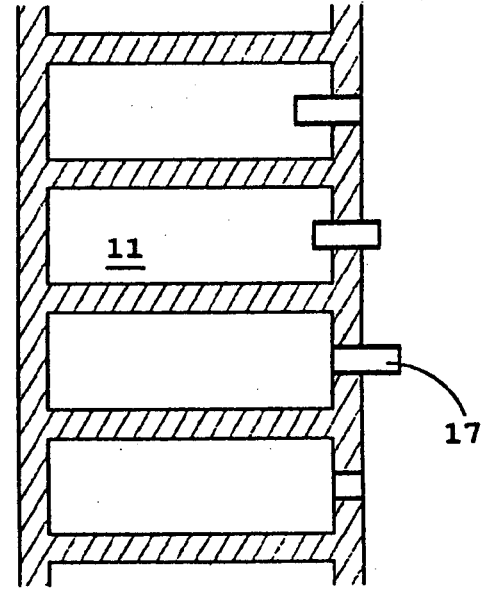
Figure 9-d

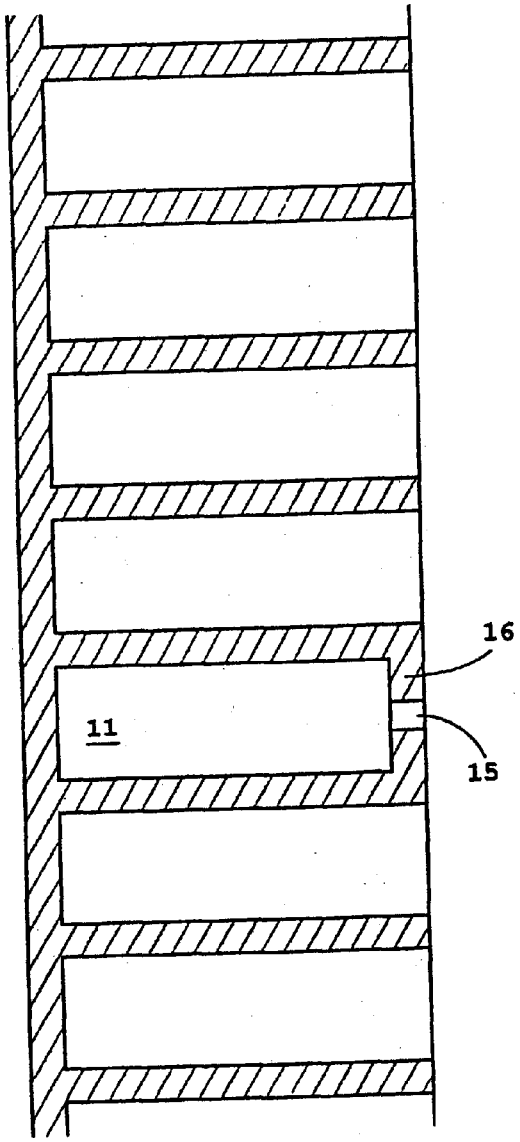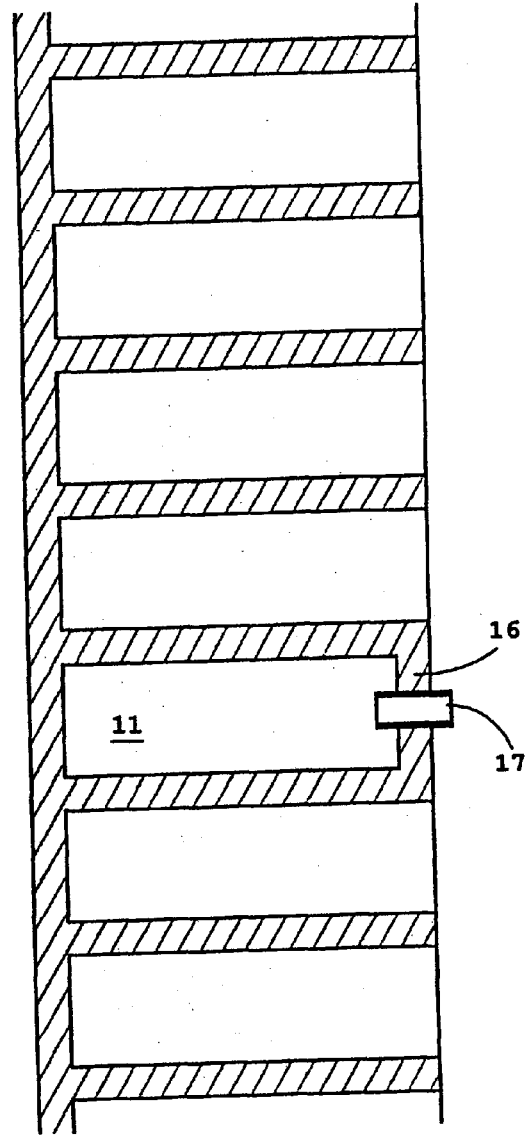
Figure 12a                    Figure 12b

SAFETY SUPPORT WITH A NOISE ATTENUATOR FOR A VEHICLE WHEEL

CROSS REFERENCE TO RELATED APPLICATION

This is a continuation of international application No. PCT/EP00/09551 filed Sep. 29, 2000, which was published in French on Apr. 5, 2001 as international publication No. WO 01/23195 A1, and which claims priority of French application No. 99/12269 filed Sep. 29, 1999.

BACKGROUND OF INVENTION

1. Technical Field of the Invention

The present invention relates to a safety support for a vehicle wheel with a tire, comprising at least one noise attenuator of the Helmholtz resonator type or the quarter-wave resonator type.

2. The Related Arts

Safety supports for vehicle wheels which use a tire are well-known. Document EP 0 796 747 describes an example of such a support. It consists of a circular body suitable for mounting on the rim of a vehicle. The example illustrated in this document is formed primarily of a vulcanised rubber mix, some zones of which are reinforced, for example with metal- or textile-type filaments. Of course, other materials may be used to produce such a support.

Generally, safety supports are mounted on a rim, within a tire, in order to provide a support for the crown of the tire during travel at low pressure, or even at zero pressure, following a puncture, for example. Thus, direct contact between the tire and the rim, which generally causes virtually instantaneous degradation of the tire, is avoided. The supports therefore make it possible to improve the safety of the vehicle by permitting running for a certain time. This time may furthermore be beneficial in finding a site for making repairs.

Furthermore, the effects caused by acoustic resonance of the air contained in a tire are known. For example, the first cavity mode (sometimes referred to as FCM) is a well-known phenomenon, but the attenuation or suppression thereof always causes numerous difficulties. The natural frequency (or resonant frequency) of a tire is a direct function of its circumference: one wavelength thus corresponds to the circumference of the wheel. A larger wheel means a greater wavelength, and therefore a lower natural frequency. By way of example, a wheel of a diameter of 15" has a natural frequency of around 230 Hz. The acoustic energy due to the resonant frequency is transmitted primarily in a solid manner. This mode of propagation means that the vibrations caused by the air present in the cavity of the tire are transmitted to the wheel, then to the support and transmission elements, finishing in the passenger compartment, where the occupants are subjected to the transmitted noise.

There are certain ways of attempting to overcome this situation. One such way is described in document WO 98/35843. According to this document, quarter-wave resonators are provided in a specially-designed holder, added to the wheel, in particular by mounting the holder on the rim. This device requires the presence of a specific holder. It is therefore an additional piece, which requires material and manufacturing time, hence supplementary costs, on the one hand, and adding an additional mass to the wheel, on the other hand.

According to a variant embodiment described in this same document, the resonators are provided in the rim. However, such a rim has to undergo major modifications in order to incorporate the resonators.

The present invention is directed at overcoming these various disadvantages, in particular suppressing the acoustic resonance due to the presence of air (or other gas) in the tire cavity or at the very least attenuating the amplitude thereof.

SUMMARY OF THE INVENTION

The foregoing and other objects of the invention are attained, according to a first aspect of the invention, by providing a vehicle wheel, comprising a rim, a tire defining with the rim a circumferential cavity C, and at least one resonator suitable for attenuating the amplitude or suppressing a natural resonance of the cavity. The wheel also comprises a safety support, for supporting the tread of the tire from the inside in the event of loss of inflation pressure, which support comprises at least one of the walls of the resonator.

This arrangement, in which the support forms at least one of the walls of a resonator, permits the attenuation of the amplitude, or even the suppression, of one or more natural resonances of the cavity, in particular of the first cavity mode. Each resonator, which is placed so as to communicate with the cavity C, tuned to the frequency or the range of frequencies on which it is desired to act, permits dissipation of the vibrational energy. It is thus possible to minimize or eliminate the transfer of vibration or sound to the passenger compartment via the wheel.

Advantageously, each resonator is formed of a cavity c, occupying a volume V in fluidic communication with the cavity C. Such fluidic communication is advantageously provided by at least one opening.

According to an advantageous variant, the resonator is arranged in the support. In such an arrangement, the walls of the cavity of a resonator may be formed by portions of the support. The walls of the support advantageously form all of the walls of a resonator.

According to another advantageous variant, the resonator is arranged adjacent to the support. In such an arrangement, the walls of the cavity of a resonator may be formed by portions of the support and rim portions.

Such a support is particularly advantageous since it makes it unnecessary to use an additional holder solely for housing the resonator(s). Thus the additional excess weight caused by such holders is avoided. Furthermore, in order to ensure the integration of the resonator(s), it is not necessary to make major modifications either to the rim or to the tire.

According to an advantageous embodiment, the resonator or resonators are Helmholtz resonators. This is a type of resonator which is simple to produce and provides very satisfactory results. This type of resonator is easy and precise to calibrate. It furthermore permits advantageous use without real modification of a safety support of known type, such as described later.

Advantageously, the opening of a Helmholtz-type resonator is of a calibrated diameter and length. The volume V and the calibrated dimensions of the opening are determined so as to attenuate the amplitude or suppress at least one acoustic resonance of the air contained in the cavity C of the tire, corresponding substantially to a given frequency or range of frequencies.

The cavities of Helmholtz resonators are generally of relatively small dimension compared with the wavelength.

According to another advantageous embodiment, the resonator or resonators are quarter-wave resonators.

These are also a type of resonator which is simple to produce and provides very satisfactory results. The dimensioning thereof is particularly simple to effect since it is necessary in particular to provide a length of cavity corresponding substantially to one-quarter of the wavelength on which it is desired to act. Several resonators may have lengths corresponding to one-quarter of several different wavelengths. It furthermore permits advantageous use without any real modification of a safety support of known type, such as described later.

According to another aspect, the invention also relates to a safety support intended to be mounted on a rim of a vehicle wheel within a tire, for supporting the tread of the tire from the inside in the event of loss of inflation pressure. The tire defines with the rim a cavity C, and the support serves to provide at least one of the walls of a resonator suitable for attenuating the amplitude or suppressing a natural resonance of the cavity.

Such a support is particularly advantageous since it makes it unnecessary to use an additional holder solely for housing the resonator(s). Thus the additional excess weight caused by such holders is avoided. Secondly, in order to ensure the integration of the resonator(s), it is not necessary to make major modifications either to the rim or to the tire.

The cavity opening or openings is/are advantageously formed of a tube.

Calibration of such tubes is simpler to effect, more precise and less expensive than the direct calibration of the openings in the walls.

According to an advantageous variant of the invention, the safety support comprises a substantially cylindrical base intended to be fitted around the rim, a substantially cylindrical apex intended to come into contact with the tread in the event of a loss of pressure, and leaving a clearance relative to the latter at nominal pressure, and an annular body connecting the base and the apex. The base, the apex and the annular body define a plurality of cavities c suitable to be connected directly or indirectly to the cavity C by at least one opening. The body may comprise two annular lateral walls connected by a plurality of partitions of substantially axial orientations, such walls and partitions defining with the base and the apex the cavities c. The partitions may be distributed regularly over the circumference.

Advantageously, some of the cavities are interconnected via openings.

According to an advantageous variant, the support is produced by assembling two main elements, the first being formed of a base, an apex and an annular body with a circumferentially continuous annular element, and a plurality of axial partitions; the second being formed of an annular element suitable for closing the cavities c when it is assembled with the base.

According to this particularly advantageous embodiment of the invention, a support of known type is used, comprising a series of circumferentially aligned cavities, but with one side open, to which simply a wall which makes it possible to close these cavities is added, in order to form the cavity of the resonator(s). In order to simplify the arrangement, the openings are provided in the attached wall. This involves a minimal modification of the support, since merely a complementary element is added thereto. It therefore retains substantially the same mass. The costs inherent in such a modification are furthermore minimal.

The present invention also provides for the use of a safety support in a vehicle wheel between the rim and the tire of the wheel, the support being provided for supporting the tread of the tire from the inside in the event of loss of inflation pressure therefrom, in order to form at least a portion of one of the walls of a cavity of a resonator arranged in the wheel and suitable for attenuating a natural resonant frequency of this cavity.

BRIEF DESCRIPTION OF THE DRAWINGS

Other characteristics and advantages of the invention will become apparent from the following description of two examples of embodiments of the safety support for a vehicle wheel comprising at least one resonator according to the invention, which is given in a non-limitative manner, with reference to the appended figures, in which:

FIGS. 8a to 8f show diagrammatically examples of variant arrangements of the openings of the resonators;

FIGS. 9a to 9d show diagrammatically examples of variant arrangements of tubes of resonators;

FIGS. 12a and 12b show examples of the integration of a resonator in a safety support according to the invention, comprising a reduced number of resonators.

DETAILED DESCRIPTION OF ILLUSTRATIVE EMBODIMENTS

Figure 1:
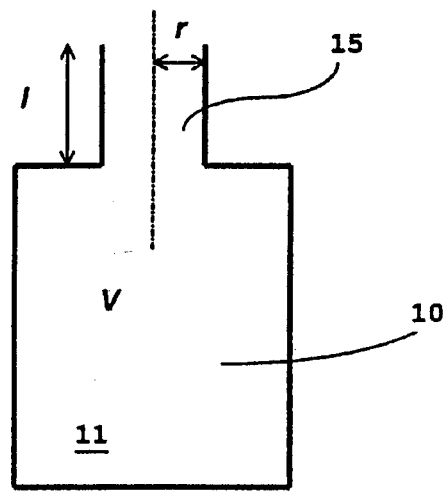
FIG. 1 is a schematic diagram illustrating the theoretical operation of a Helmholtz-type resonator.

FIG. 1 illustrates diagrammatically the principle of operation of a Helmholtz resonator 10. Such a resonator includes a cavity 11, defining a volume V and having an opening or neck 15 of radius r (or section a) and of length 1. This arrangement provides a mode of vibration at a given frequency. It is in fact the volume of air, or of a given gas, contained in the neck 15 which is caused to move in an oscillating movement. It may be likened to a small mass; the cavity of the resonator then acts as a spring on which the mass bears. In the case in which the opening of the cavity is circular, the frequency of this resonator is provided by the following relationship:

$$f_H (k/2\pi) X (a/l'V)^{1/2} \qquad (1)$$

The frequency, therefore, depends only on the speed of the sound k and the dimensions of the resonator.

In Equation (1), l' is the apparent length of the neck of the resonator. For a cylindrical neck of radius r (section $a=\pi r^2$), this apparent length is calculated as follows:

l'=l+1.5 r if the edges of the neck are projecting;

l'=l+1.7 r if the edges of the neck are flush.

The apparent length l' is therefore slightly longer. This conveys the fact that the volume of air which oscillates at the neck is a little greater than the neck.

Figure 3:
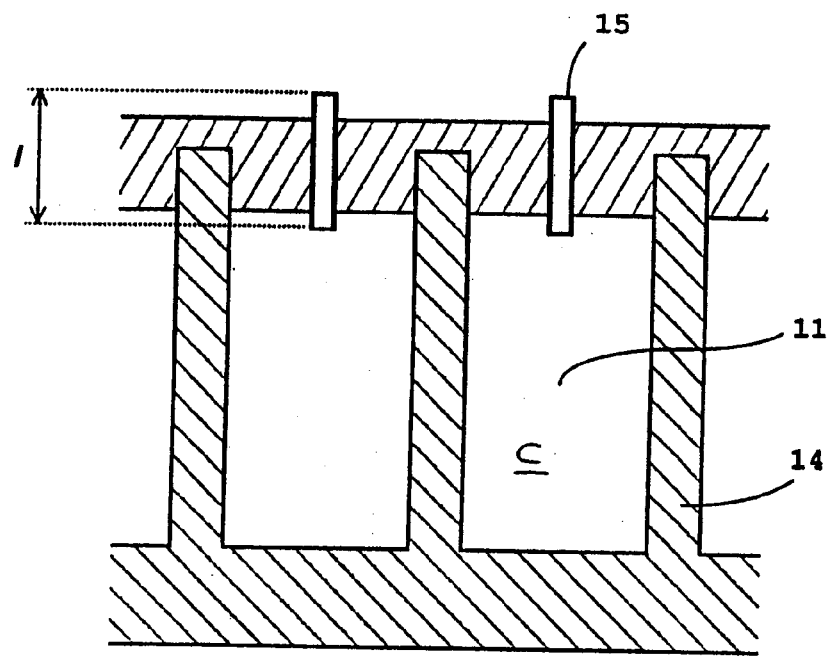
FIG. 3 is a sectional view showing an example of the integration of a resonator into a safety support according to the invention.

Tests were carried out with a set comprising resonators (illustrated in FIG. 3) of a cavity 11 of volume V=75 ml and an internal diameter of the neck 15 of 6 mm. To attenuate a frequency of the order of 195 Hz, a neck of a length of approximately 25 mm is required. Particularly advantageous results are then obtained.

In the case where the opening of the cavity is not circular, an equivalent relationship can be established in order to permit dimensioning of this opening. In fact, the opening may be square, rectangular, or adopt a multitude of other forms.

FIGS. 2a to 2d illustrate different examples of wheels according to the invention in cross-section. The wheel 1 comprises a rim 2 on which there is mounted a tire 3. A support 4 is arranged within the tire, mounted against the rim 2. Examples of embodiments of a rim, a support and a tire are described in documents EP 0 796 747 and U.S. Pat. No. 4,248,286, which descriptions are hereby incorporated by reference.

According to the invention, the support 4 furthermore comprises a multiplicity of Helmholtz resonators. These are advantageously formed in the hollow portion of the support. Thus, according to the various examples of FIGS. 2a to 2d, cavities 11 separated by inter-cavity walls 14 (FIGS. 3 and 4) are distributed circumferentially between the radially outer 12 and inner 13 walls of the support. Each of the cavities 11 defines a volume V defined by the space between the outer 12 and inner 13 walls, on one hand, and the two inter-cavity walls 14 and the two lateral walls 16, on the other hand. The cavities 11 illustrated in FIGS. 2a–2d and 4 occupy substantially equal volumes. However, variants with cavities comprising different volumes, for example two, three or more given volumes distributed circumferentially, are also possible.

Figure 2A:
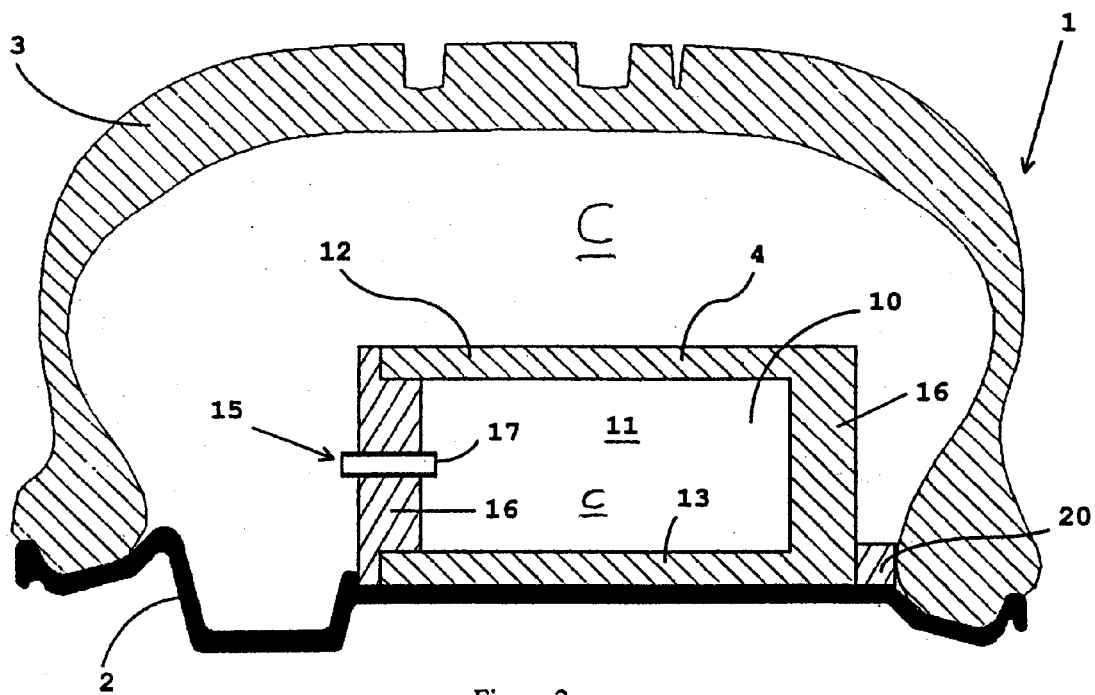
FIGS. 2a to 2d show views in cross-section of different embodiments of wheels according to the invention, comprising safety supports with resonators.
Figure 2B:
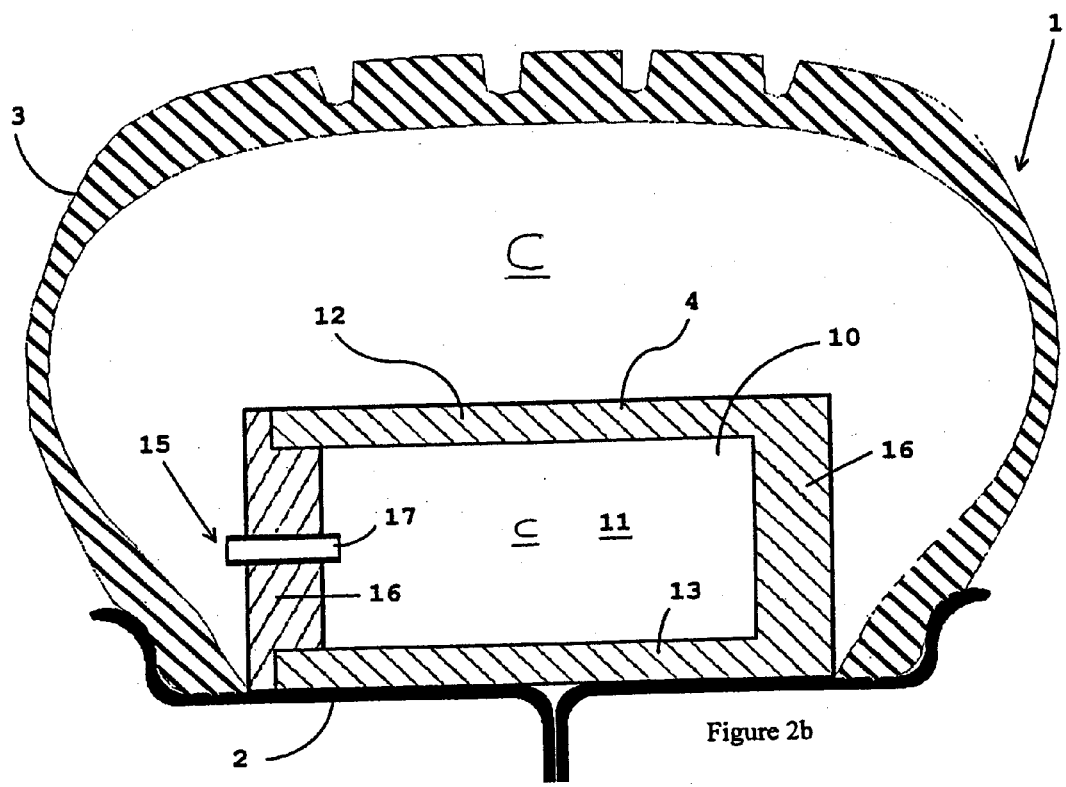
Figure 2C:
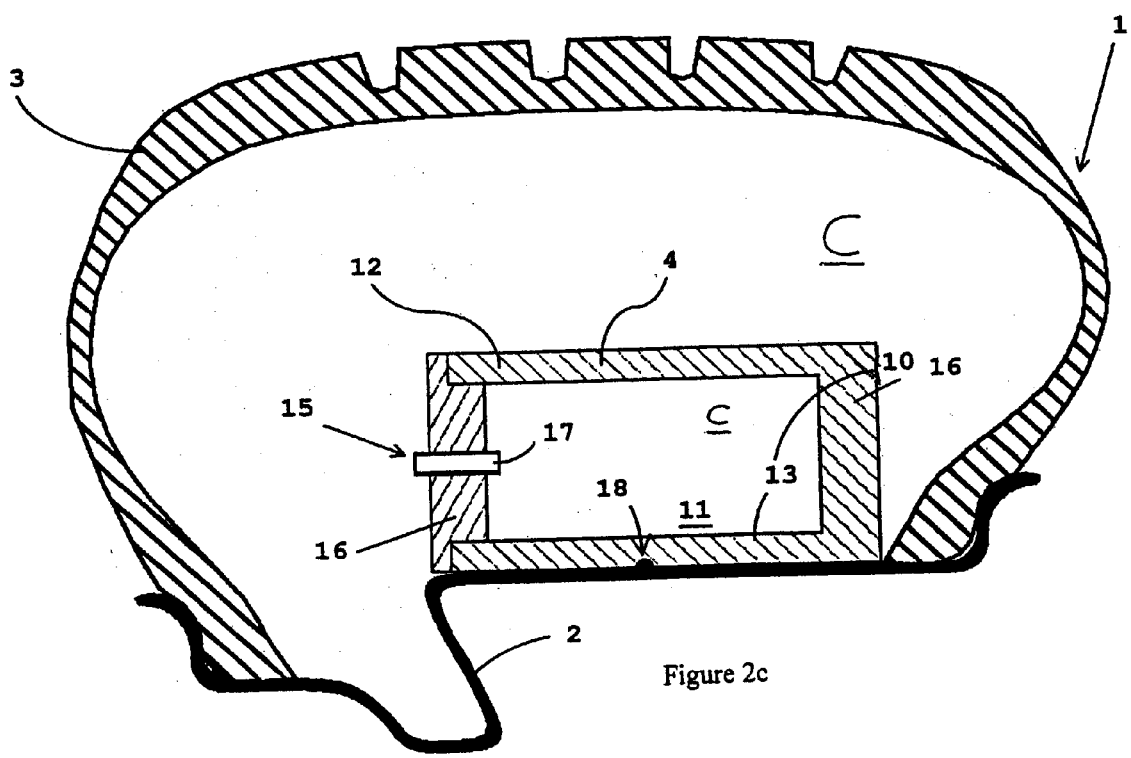
Figure 2D:
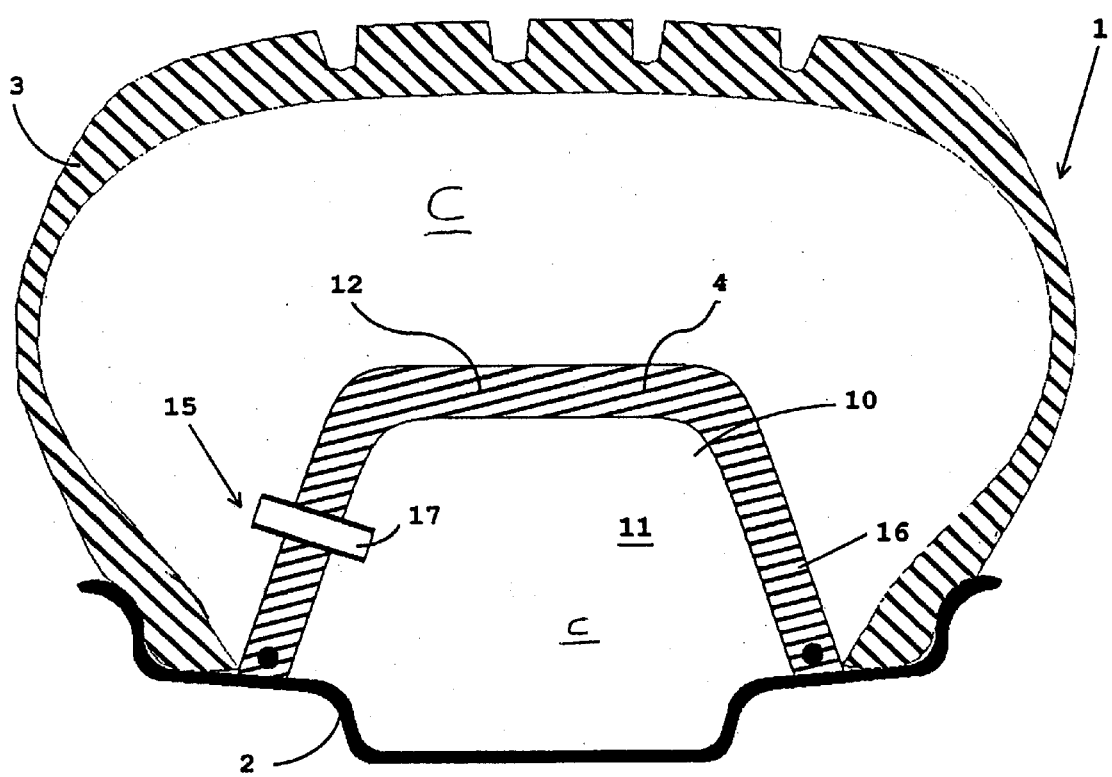

According to the example illustrated in FIGS. 2a–2d and 4, for each of the resonators, one of the walls which is adjacent to or communicates with the cavity C of the tire comprises at least one opening 15. As illustrated in FIGS. 2a–2d, the opening is advantageously provided at the level of the lateral wall 16 which faces the inner sidewall of the tire, which is provided for being mounted from the inner side of the wheel. Obviously, according to various variants, the opening may also be arranged on another wall, such as, for example, the outer wall 12. In the example of FIG. 2d, the lower wall of the resonator is formed by a portion of the rim 2.

Figure 4:
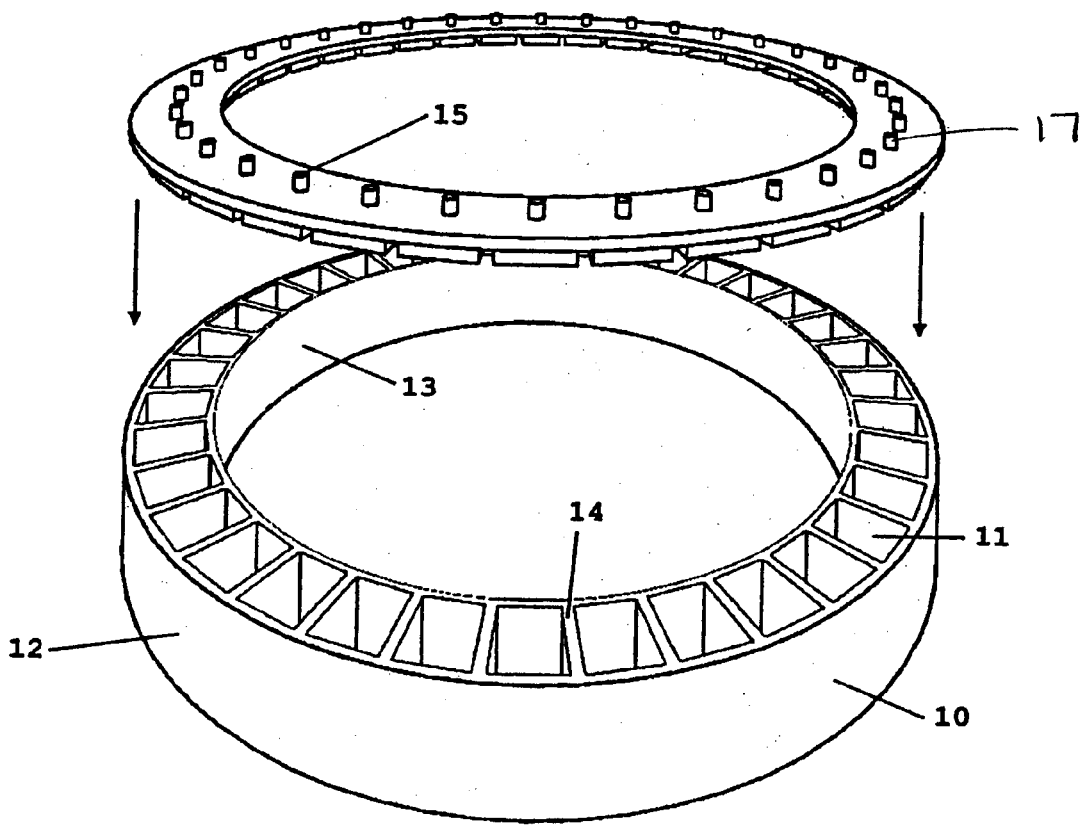
FIG. 4 is a perspective view showing an example of an embodiment of a support comprising a multiplicity of resonators.

FIG. 4 illustrates an advantageous variant in which the resonators are formed by the cells 11 of a safety support of known type. In order to simplify the arrangement, the openings 15 are provided in the attached wall. Tubes 17, arranged in the openings, make it possible to optimise the vibrational characteristics of the resonators.

Although FIG. 4 illustrates a support in which the cavities 11 are of identical volumes and are arranged in a regular order, the volumes may vary along the circumference, and/or the arrangement may be non-uniform and comprise, for example, sections without a resonator, or with resonators of other dimensions, etc. The dimensions and positions of the openings 15 and/or of the tubes 17 may also vary along the circumference. The use of resonators of different characteristics may for example serve to attenuate different frequencies of resonances which each appear at a distinct speed of rotation. FIGS. 13a to 13d illustrate other examples in which only a few cavities are used to form resonators. In fact, several tests have shown that the use of a restricted number of resonators may make it possible, in certain cases, satisfactorily to attenuate the acoustic energy generated by the vibration of air in the cavity. FIGS. 12a and 12b illustrate how such resonators may for example be integrated into a support.

Figure 5:
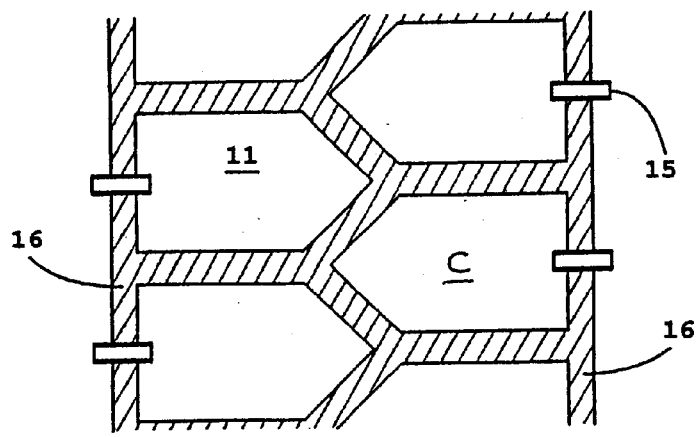
FIG. 5 is a sectional view showing a diagram of an example of the arrangement of resonators in a support.

According to another variant illustrated in FIG. 5, the resonators may for example be arranged in opposition, in an alternating arrangement, as illustrated.

Figure 6:
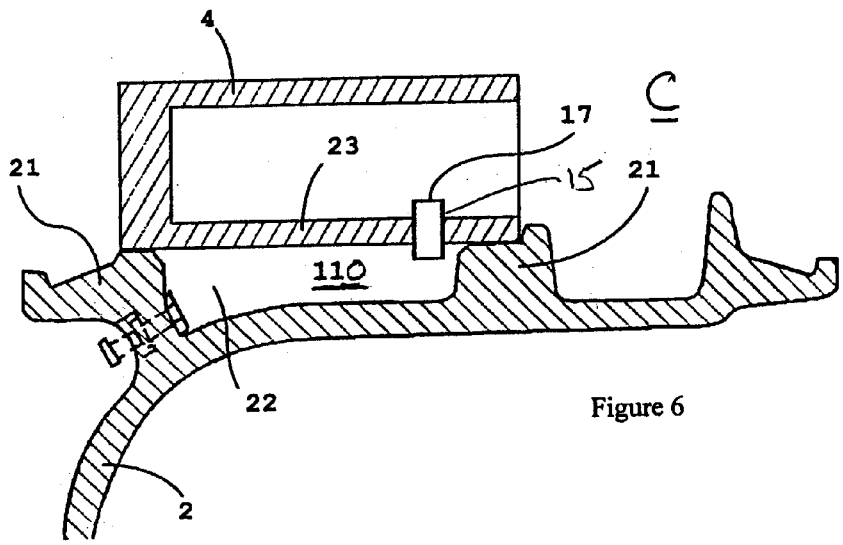
FIGS. 6 and 7 are sectional views of examples of wheels according to the invention, comprising at least one resonator formed between profile elements of the rim and one or more of the walls of the support.
Figure 7:
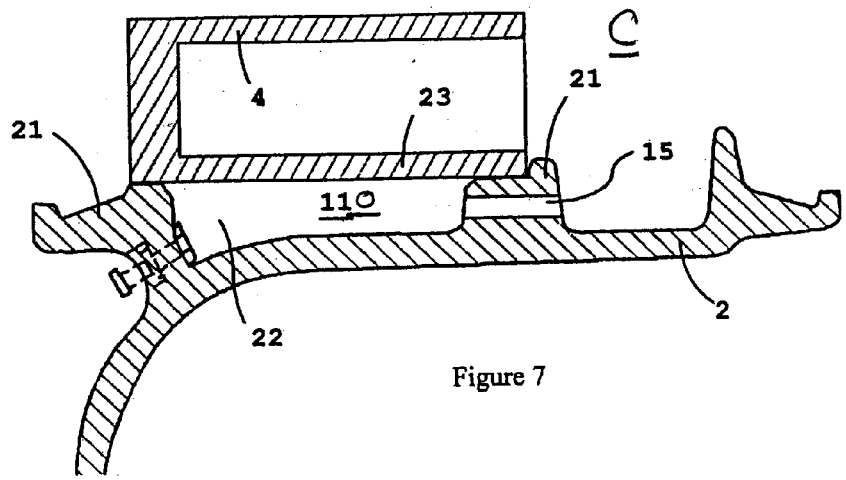

FIGS. 6 and 7 illustrate embodiments according to the invention in which the support 4 is arranged against the rim 2 so as to form a cavity 110 between the rim and the support. This cavity 110 will serve in part to form the resonators. According to this embodiment, the rim 2 comprises prominent portions 21 or raised areas between which hollow portions 22 or valleys are defined. To obtain a cavity of the type of that of a resonator, it is sufficient to close the hollow portions 22 with a closing wall 23. In this case, advantageously one or more of the walls of a support 4 is/are used, for example arranged against the prominent portions 21 of the rim.

Adding one or more openings 15 makes it possible to obtain a Helmholtz-type or quarter-wave-type resonator. The openings 15 may be provided in the closing wall 23 of the support, as illustrated in FIG. 6, or within the rim, for example via a prominent portion 21, as illustrated in FIG. 7. A tube 17 may also be arranged in the opening, whether the latter be provided in the rim or in the support.

Radial walls extending between the rim 2 and the wall 23 of the support so as to isolate several cavities c circumferentially around the rim make it possible to obtain an assembly comprising a multiplicity of resonators.

There results from the examples illustrated in FIGS. 6 and 7 one or more resonators, each with a cavity 110, in fluidic communication with the cavity C formed between the rim and the tire, via an opening 15, possibly provided with a tube 17.

Such a configuration is particularly advantageous since it makes it possible to reduce the amplitude or even to suppress certain resonant modes of the cavity C, without the rim having to be modified significantly (at the very most, one or more holes have to be provided at the level of the rim) or without requiring the provision of an additional element designed solely to house the resonators.

Such a configuration may serve for arranging Helmholtz-type or quarter-wave-type resonators.

FIGS. 8a to 8f illustrate examples of variant arrangements of the openings 15 which permit fluidic communication between the respective cavities 11 of the resonators and the wheel. Thus FIG. 8a illustrates a first example in which the openings 15 are all substantially of the same diameter. FIG. 8b illustrates an example comprising a series of openings with different diameters, in this case in a substantially regular progression from the smallest to the largest diameter. FIG. 8c illustrates a variant in which pairs of cavities are in fluidic communication with each other, each furthermore being connected to the cavity C of the wheel. In the example illustrated, the openings 15 are of different diameters and at different positions, but one and/or the other could be identical. FIG. 8d illustrates another variant, in which four cavities communicate, with only one of them communicating with the cavity C of the wheel.

According to an advantageous variant, in particular for Helmholtz resonators, the cavities are arranged so as to form a network. FIGS. 8c, 8d and 8f illustrate such examples. Such an arrangement may possibly act on one or more frequencies. One variant of the type illustrated in FIG. 8d may furthermore make it possible to facilitate dual mounting of a support according to a tire of a given dimension. One or more series of cavities are interconnected. Depending on the frequency or the range of frequencies on which it is desired to act, one or more cavities of each series is pierced in order to establish communication with the cavity C of the wheel. It is thus possible to use one and the same support for several dimensions of tires.

Such examples of variants may obviously be used both for embodiments in which the resonators are fully integrated with the support and for embodiments in which the resonators are formed by walls of the support and of the rim.

FIGS. 9a to 9d illustrate examples of variants of arrangements of the openings which permit fluidic communication between the respective cavities of the resonators and of the wheel with different examples of arrangements of tubes 17. Thus, FIG. 9a illustrates a first example in which the tubes 17 are all substantially of the same diameter and of the same length. FIG. 9b illustrates an example comprising a series of cavities with tubes of different lengths, in this case in a substantially regular progression from the shortest length to the longest length. FIG. 9c illustrates an example, comprising a series of cavities with tubes 17 of different diameters, in this case in a substantially regular progression from the smallest diameter to the largest diameter. Finally, FIG. 9d illustrates a variant in which the tubes 17 are arranged in different types of arrangements. Of course, it is possible to combine these different types of configurations together, or to conceive of still further ones, for example with irregular progressions and/or series comprising a different number of cavities, without departing from the scope of the present invention.

In practice, during travel, due to the loading of the tire and the rotation of the wheel, there is the risk that splitting of the resonant frequency may occur, in particular in the first cavity mode. With Helmholtz resonators, it is possible to choose to have different resonators each acting at different frequencies, or alternatively to have for example pairs or other sets of resonators, etc.

Such examples of variants may obviously be used both for embodiments in which the resonators are fully integrated with the support and for embodiments in which the resonators are formed by walls of the support and of the rim.

Figure 10:
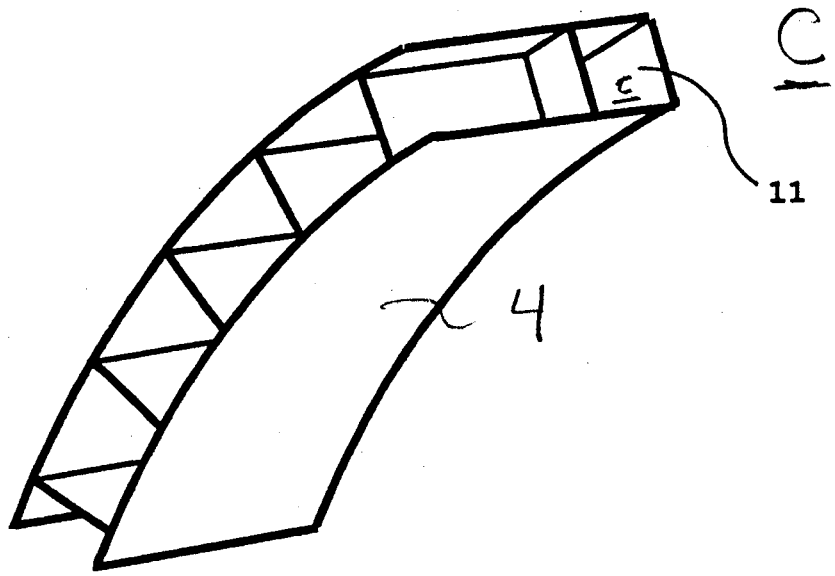
FIG. 10 is a perspective view of an example of a support in which there is arranged a resonator of the quarter-wave type.
Figure 11:
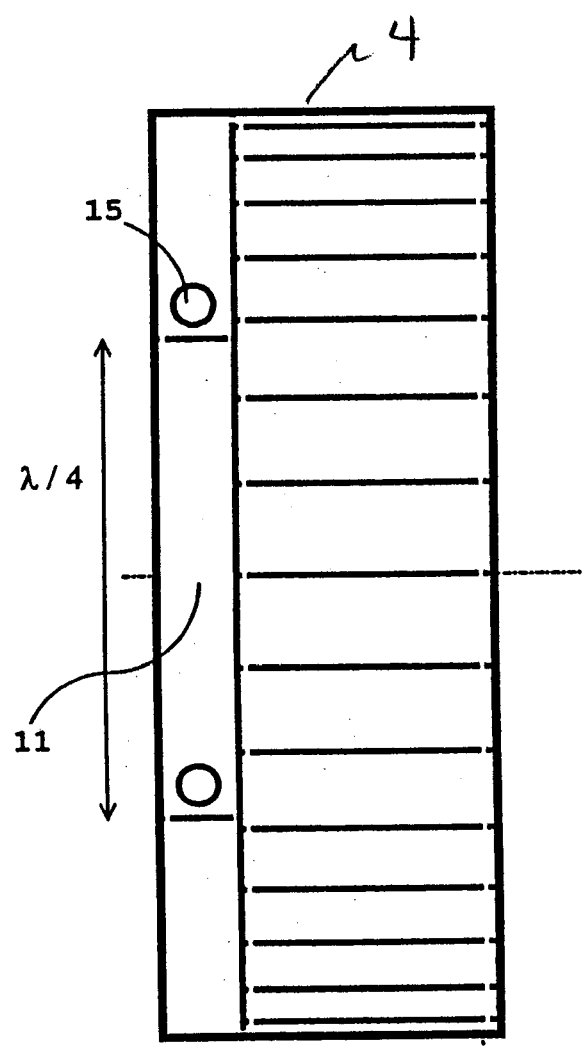
FIG. 11 show the support of FIG. 10, viewed in elevation.
Figure 13A:
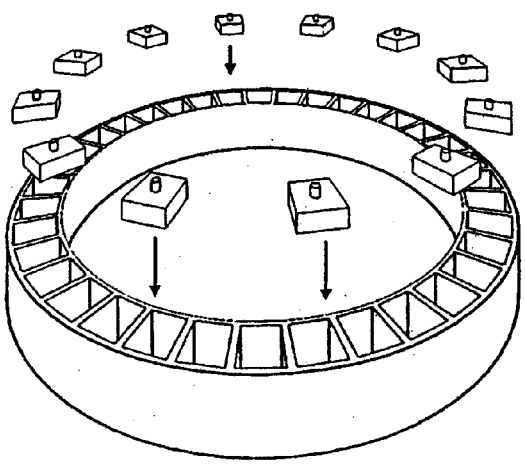
FIGS. 13a to 13d illustrate examples of the integration of several resonators in a safety support according to the invention, comprising a reduced number of resonators.
Figure 13B:
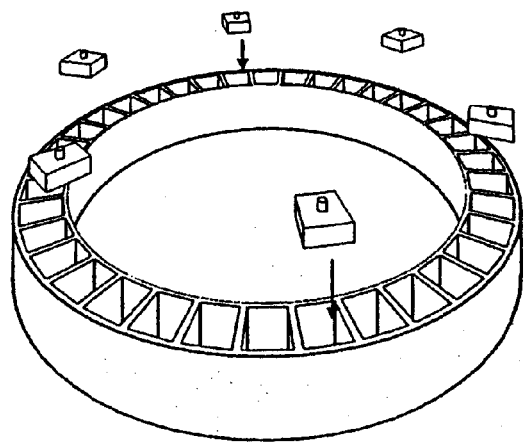
Figure 13C:
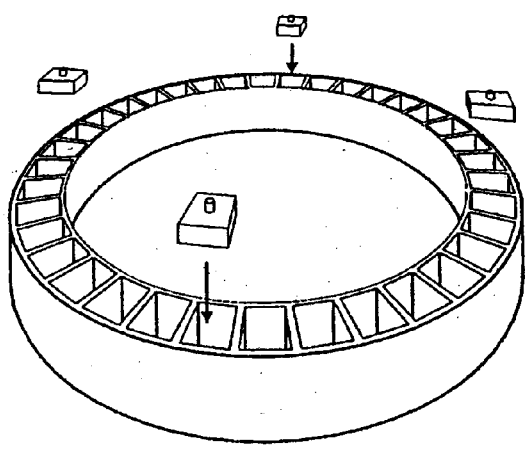
Figure 13D:
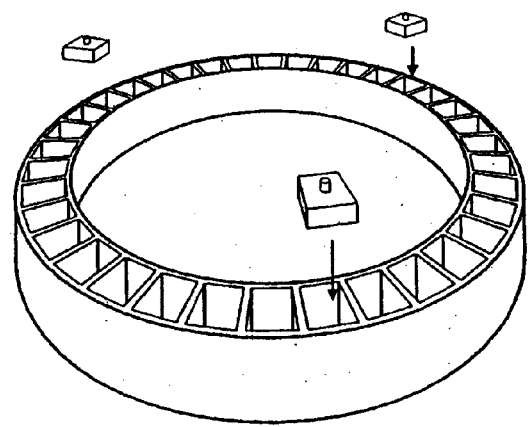

According to another advantageous embodiment of the invention illustrated in FIGS. 10 and 11, the safety insert 4 is used to house quarter-wave resonators. According to this type of resonator, the insert may be subdivided for example into two or four sections or cavities 11, each corresponding substantially to one-quarter of the wavelength of the natural resonance which it is desired to attenuate. Each cavity c is connected directly or indirectly to the cavity C formed in the volume located between the tire and the rim by at least one opening.

The example illustrated in FIGS. 10 and 11 shows a safety support 4 of the same type as that shown in FIG. 2, in which cavities 11, of elongated form, (since they have to cover $\lambda/4$) are distributed circumferentially against the body of the support. FIG. 11 illustrates the alignment of the cavities which are provided with openings 15, possibly equipped with tubes similar to those already described. The openings 15 ensure fluidic communication between the cavities 11 and the cavity C of the wheel. Typically, a quarter-wave resonator comprises at least one cavity, extending over a circumferential distance of about $\lambda/4$. A circumferentially symmetrical arrangement facilitates balancing of the wheel. Several series of resonators may be provided, so as to obtain more than four, for example eight.

The effect of this resonator is to produce a reverse-phase wave relative to the spurious wave, the effect of which is to inhibit the latter.

With resonators of the quarter-wave type, provision may also be made for a resonator larger than one-quarter of a wavelength, in order to act against a lower frequency, or a resonator smaller than one-quarter of a wavelength, in order to act against a higher frequency.

It is also possible to configure a quarter-wave resonator with an elongated cavity covering substantially a distance of the order of $\lambda/2$, with a substantially central opening. Each half-cavity then acts as a resonator.

With resonators of one or the other type, it is possible to aim at an average frequency and/or to increase the range of effectiveness of the resonator. For example, a resonator may cover a given band of frequencies. The range of effectiveness can be widened by arranging in or against a resonator a damping material, such as, for example, a foam-type material.

Since the resonant frequency of a wheel is directly linked to the diameter of the wheel, it is easy to adapt the present device to all possible wheel dimensions, knowing that the greater the diameter of the wheel the lower the natural frequency will be.

Such examples of variants may obviously be used both for embodiments in which the resonators are fully integrated with the support and for embodiments in which the resonators are formed by walls of the support and of the rim.

What is claimed is:

1. A vehicle wheel, comprising a rim, a tire, said tire defining with said rim a circumferential cavity C and being provided with a tread, said wheel further comprising at least one resonator provided with walls and suitable for reducing the amplitude of a natural resonance of said cavity, a safety support, for supporting said tread of said tire from the inside in the event of a loss of inflation pressure, said support providing at least one of the walls of said resonator.

2. The vehicle wheel of claim 1, in which each resonator is formed of a cavity c, occupying a volume V in fluidic communication with said cavity C.

3. The vehicle wheel of claim 1, in which said walls of said support form all the walls of said resonator.

4. The vehicle wheel of claim 2, in which said walls of said cavity of said resonator are formed by portions of said support.

5. The vehicle wheel of claim 2, in which said walls of said cavity of said resonator are formed by portions of said support and portions of said rim.

6. The vehicle wheel of claim 1, in which said resonance corresponds to a first cavity mode.

7. The vehicle wheel of claim 2, in which said fluidic communication is provided via at least one opening of a calibrated diameter and length.

8. The vehicle wheel of claim 1, in which said resonator is a Helmholtz resonator.

9. The vehicle wheel of claim 1, in which said resonator is a quarter-wave resonator.

10. A vehicle wheel, comprising a rim, said tire defining with said rim a circumferential cavity C and being provided with a tread, said wheel further comprising at least one resonator provided with walls and suitable for reducing the amplitude of a natural resonance of said cavity, a safety support, for supporting said tread of said tire from the inside in the event of a loss of inflation pressure, said support providing at least one of said walls of said resonator, wherein each resonator is formed of a cavity c, occupying a volume V in fluidic communication with said cavity C, said fluidic communication being provided via at least one opening of a calibrated diameter and length, the volume V and the calibrated dimensions of the opening being determined so as to attenuate at least one acoustic resonance of the air contained in the cavity C of the tire, corresponding substantially to a given frequency.

11. A safety support intended to be mounted on a rim of a vehicle wheel within a tire, for supporting a tread of said tire from the inside in the event of a loss of inflation pressure, said tire defining with the rim a cavity C, said support serving to provide at least one of the walls of at least one resonator suitable for attenuating the amplitude of a natural resonant frequency of said cavity.

12. The safety support of claim 11, in which each said resonator is arranged in said support.

13. The safety support of claim 11, in which each said resonator is formed of a cavity c, occupying a volume V, defined in said support and adapted to be in fluidic communication with said cavity C.

14. The safety support of claim 11, comprising:
 a substantially cylindrical base intended to be fitted around the rim,
 a substantially cylindrical apex intended to come into contact with said tread in the event of a loss of pressure, and leaving a clearance relative to the latter at nominal pressure, and an annular body connecting said base and said apex, said base, said apex and said annular body defining a plurality of cavities c suitable to be connected directly or indirectly to the cavity C by at least one opening.

15. The safety support of claim 14, in which said body comprises two annular lateral walls connected by a plurality of partitions of substantially axial orientations, said walls and partitions defining said cavities c with the base and the apex.

16. The safety support of claim 14, produced by assembling a first and a second main elements, the first being formed of a base, an apex and an annular body with a circumferentially continuous annular element, and a plurality of axial partitions; the second being formed of an annular element suitable for closing said cavities c when it is assembled with the base.

17. The safety support of claim 11, in which said resonator is a Helmholtz resonator.

18. The safety support of claim 11, in which said resonator is a quarter-wave-type resonator.

* * * * *

UNITED STATES PATENT AND TRADEMARK OFFICE
CERTIFICATE OF CORRECTION

PATENT NO.     : 6,516,849 B2
DATED          : February 11, 2003
INVENTOR(S)    : Flament et al.

It is certified that error appears in the above-identified patent and that said Letters Patent is hereby corrected as shown below:

<u>Title page,</u>
Item [56], References Cited, OTHER PUBLICATIONS, "Pneuatic" should read -- Pneumatic --

<u>Column 4,</u>
Line 67, Equation (1), "($\alpha$/l'V)" should read -- (a/l'V) --

Signed and Sealed this

Twelfth Day of August, 2003

JAMES E. ROGAN
*Director of the United States Patent and Trademark Office*